United States Patent
Lerner et al.

(10) Patent No.: US 8,421,608 B2
(45) Date of Patent: Apr. 16, 2013

(54) VIBRATING TRIGGER BUTTON

(76) Inventors: Harry B. Lerner, Woodbury, NY (US); Than Cho Cho, Singapore (SG)

(*) Notice: Subject to any disclaimer, the term of this patent is extended or adjusted under 35 U.S.C. 154(b) by 600 days.

(21) Appl. No.: 12/655,077

(22) Filed: Dec. 22, 2009

(65) Prior Publication Data

US 2010/0194546 A1 Aug. 5, 2010

Related U.S. Application Data

(60) Provisional application No. 61/203,411, filed on Dec. 23, 2008.

(51) Int. Cl.
*H04B 3/36* (2006.01)
*B26B 19/28* (2006.01)

(52) U.S. Cl.
USPC .......................... 340/407.1; 340/407.2; 30/44

(58) Field of Classification Search ............... 340/407.1, 340/384.6, 3, 390.1, 390.2, 407.2; 30/44, 30/45, 162; 5/615; 200/334, 341; 156/494, 156/530
See application file for complete search history.

(56) References Cited

U.S. PATENT DOCUMENTS

| | | | |
|---|---|---|---|
| 4,352,091 A | 9/1982 | Yamasaki | |
| 4,871,414 A * | 10/1989 | Niedrig | 156/494 |
| 5,283,970 A * | 2/1994 | Aigner | 42/57 |
| 5,635,897 A | 6/1997 | Kuo | |
| 5,684,287 A | 11/1997 | Walts | |
| 5,806,115 A * | 9/1998 | Brown | 5/615 |
| 6,919,522 B2 * | 7/2005 | Uehira | 200/341 |
| 7,178,244 B2 * | 2/2007 | Fossella | 30/162 |
| 7,637,014 B2 * | 12/2009 | Schnak et al. | 30/44 |
| 7,744,592 B2 * | 6/2010 | Hoenig et al. | 606/33 |

* cited by examiner

*Primary Examiner* — Van T. Trieu
(74) *Attorney, Agent, or Firm* — Thomas A. O'Rourke; Bodner & O'Rourke, LLP

(57) ABSTRACT

A trigger switch for a hand-held device provides vibrating alerts directly to one or more fingers of a user's hand when signaled by the device. The trigger switch housing is pivotally mounted in the device with a stop to limit outward travel therefrom. A housing cavity receives a miniaturized vibrating motor that is electrically coupled to a printed circuit board, which has a wire bundle with a connector to couple the board to the device. The motor's body may contact one side of the printed circuit board, and directly on the opposite side of the board may be a platform with a post extending therefrom to support one end of a coil spring, with the other end being retained within the device. When the user completes an operation, the device may signal the printed circuit board, which causes a counterweight to rotate and transmit vibrations to the trigger switch.

32 Claims, 12 Drawing Sheets

VIBRATING TRIGGER BUTTON

This application claims priority on U.S. Provisional Application Ser. No. 61/203,411 filed on Dec. 23, 2008, the disclosures of which are incorporated herein by reference.

FIELD OF THE INVENTION

The present invention relates to improvements in feedback alerts to users of mobile devices, and more particularly to a vibration alert which is more effective while reducing power consumption, weight and cost.

BACKGROUND OF THE INVENTION

There are now, and have in the past, been many electronic devices which seek to interact and communicate with a user in one form or another. One of the oldest examples may be the Morse code signals transmitted by the electric telegraph around 1840, which originally marked indentations on a paper tape that needed to be translated, but the operators soon learned to directly translate the message from the clicking noises made by the receiver's armature. It was Alexander Graham Bell's experiments with a harmonic telegraph which sought to transmit several telegraph messages simultaneously that led to his development of a device to transmit speech electrically, and this evolved into phone systems using an audio signal or ringer to alert the user.

With the development of the cathode ray tube (CRT), communication could be accomplished in silence by having textual data appearing on the CRT screen to replace noisy teletype machines, which were common in World War II, but today are mainly used in devices for the hearing impaired. However, the silent transmission of data occasioned the need for other kinds of alerts, which might yet be in the form of a bell, or a signal light, and even pre-recorded messages.

However, advances in electronics and the need for an alert that might be received solely by the owner or recipient and without awareness of others, particularly in a business or work setting, led to the development of tactile alerts. A tactile alert could communicate with the user to provide notification of a message received, or feedback as to input made or a task accomplished, or to signal a request for input or attention.

These tactile alerts became prevalent in beepers or pagers, which originally had been solely numeric in nature, receiving on its display the phone number to be called. An example of a paging device is shown by U.S. Pat. No. 4,352,091 to Yamasaki for "Radio Pager Having Optional Annunciating Means." The Yamasaki device disclosed that "signals activate a mechanical vibrator to tactilely inform the subscriber that he is being paged."

The use of tactile alerts was naturally adapted to be used in cell phones, with an example shown by U.S. Pat. No. 5,635,897 to Kuo. The Kuo patent features a decoder that "decodes the signal so obtained and generates an alarm signal, which is either an audio signal via a sound generating means, such as a buzzer . . . or a vibrating signal via a vibrator . . . to notify the user."

Advantageous use of a vibration alert is similarly found in hand-held scanning devices, which have found prolific use which includes the retail industry for performing price checks, inventory audits, and point-of-sale transactions. An example of a device integrating a vibration alert is found in U.S. Pat. No. 5,684,287 to Robert Walts for a "Bar Code Scanner With Tactile/Vibratory Signaling Means." Walts discloses that an "inexpensive circuit is utilized to create a tactile vibration to allow for an operator to be notified of a successful bar code scan in noisy environments" and that "this tactile vibration system can be used together with either an audible indication system (such as a beep sound), or a visible indication system (such as an LED on the bar code scanner), or both . . . ."

Although Walts further provides that the desired amount of vibration and the length of vibration time per alert may be adjusted, the patent fails to address several key drawbacks of its implementation within the device. First, the power requirements for a motor to vibrate a scanning device with sufficient amplitude to alert the user may rapidly degrade battery power, particularly in a noisy environment where the user may be jostled about or may be standing on a warehouse platform that itself experiences vibrations from the motion of vehicles. The Walts patent fails to consider this issue, and conversely even recommends implementation of a vibrating alert system in the seat cushion or foot-petal of a motorized vehicle, such as a forklift.

The problem becomes exacerbated for the hand-held device where the mass of the portable device increases, requiring ever larger vibrating motors and counterweights to be used, increasing cost, weight, and power consumption, which may be problematic for many of today's mobile computing devices. Also, use in larger portable devices means the vibration may be damped by components before reaching the user. This invention solves these drawbacks with a unique arrangement that creates and directs the vibrations in close proximity to the most sensitive part of the user's hand—to the fingers which is interacting with the device, and which may therefore be the focus of the user's attention when receiving a vibratory signal.

OBJECTS OF THE INVENTION

It is an object of the invention to provide a means of signaling a user of a hand-held device with a vibration alert.

It is another object of the invention to provide, for a hand-held device, a vibration alert which is capable of making efficient use of battery power.

It is a further object of the invention to provide a vibration alert which may be felt by the user even when low amplitude vibrations are emitted by the motor.

It is also an object of the invention to provide a vibration alert which may be felt and distinguished by the user who may be exposed to other ambient vibrations.

It is another object of the invention to provide a vibration alert which may be felt by the user in the most sensitive part of the user's grip.

It is also an object of the invention to provide a vibration alert system which may be light-weight and compact.

SUMMARY OF THE INVENTION

A trigger switch for a hand-held scanning or mobile computing device may provide vibrating alerts directly to one or more fingers of a user's hand when signaled by the device. The trigger switch may be a simple button that may be pivotally mounted in the device, or it may be a more involved housing with a cavity and cavity features to house components.

The button or housing may have one or more stops to limit inward and/or outward travel relative to the device. A spring may bias the trigger switch to the outward position, so that when a user needs to toggle the switch to make an input, the trigger button may be squeezed to signal the device. The spring may be a coil spring retained by a post on the button or housing, or there may be a torsion spring that may be mounted in conjunction with the pivotal mounting of the button to the device.

The button or housing cavity may receive a miniaturized vibrating motor that is electrically coupled to a printed circuit board, which has a wire bundle with a connector to couple the board to the device. The motor may be attached to the button or housing mechanical fasteners, include, but not limited to a nut and bolt, or it may be nested within a plurality of walls, and secured therein by the printed circuit board.

The motor's body may contact one side of the printed circuit board, and directly on the opposite side of the board may be a platform with a post extending therefrom to support one end of a coil spring, with the other end being retained within the device. When the user completes an operation, the device may signal the printed circuit board, which causes a counterweight to rotate and transmit vibrations to the trigger switch. The counterweight may create vibrations below, at, or near the natural resonance frequency of the spring-mass system. The arrangement may also be damped with a foam pad in order to quickly eliminate vibrations cause by the motor after the alert is to end, as the counterweight of the motor slowly spins to a static condition. This damping may permit a more discrete time period for delivery of a vibratory alert.

DETAILED DESCRIPTION OF THE INVENTION

Figure 1:
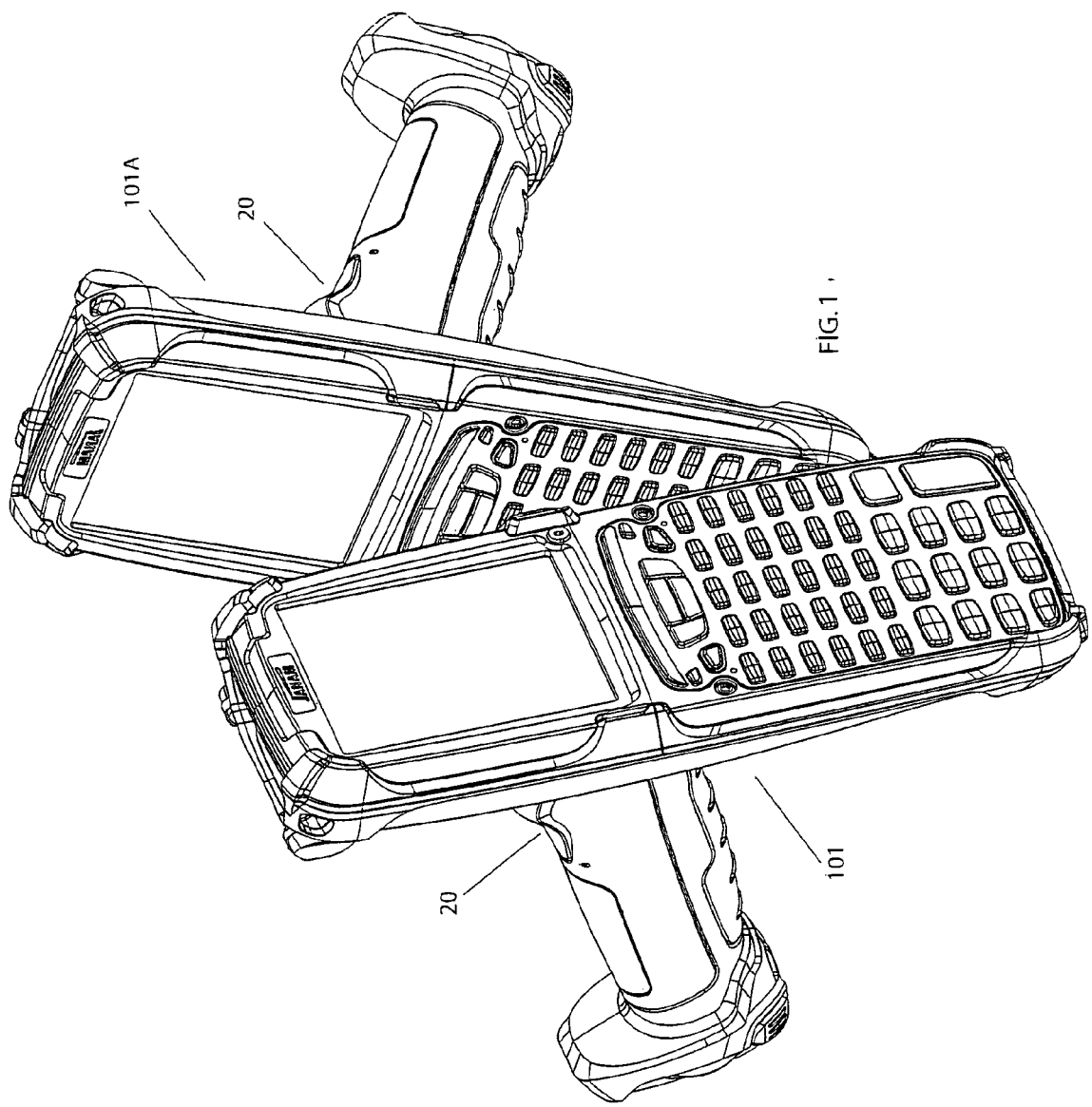
FIG. 1 is a perspective view of a Gun-Shaped Mobile Computing Device to be illustrative of the kinds of devices which may utilize the vibrating trigger of the current invention.
Figure 2:
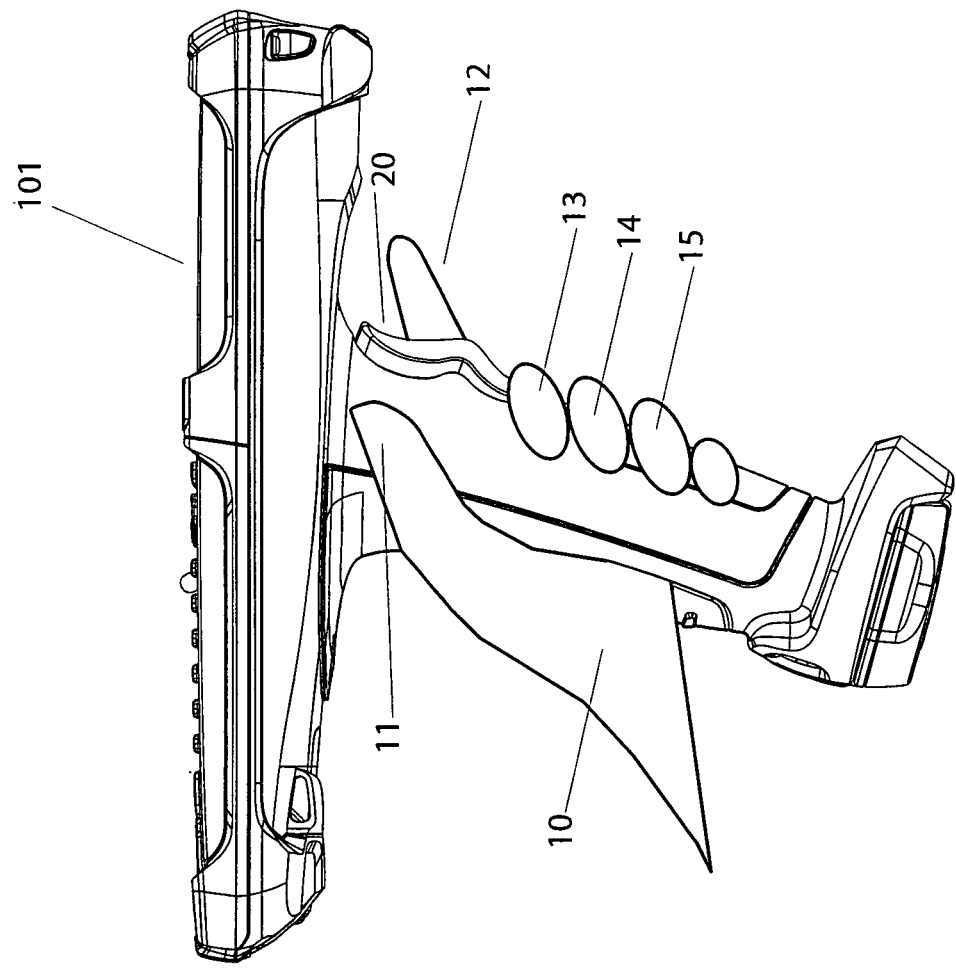
FIG. 2 is a side-view of Gun-Shaped Mobile Computing Device that is shown with a user's hand gripping the handle of the device, while preparing to depress the trigger of the current invention.
Figure 3:
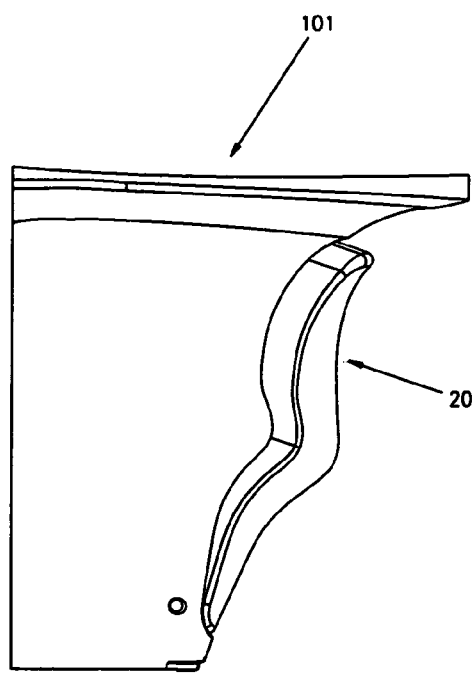
FIG. 3 is an enlarged side view of the trigger of the current invention, as installed in a device.
Figure 4:
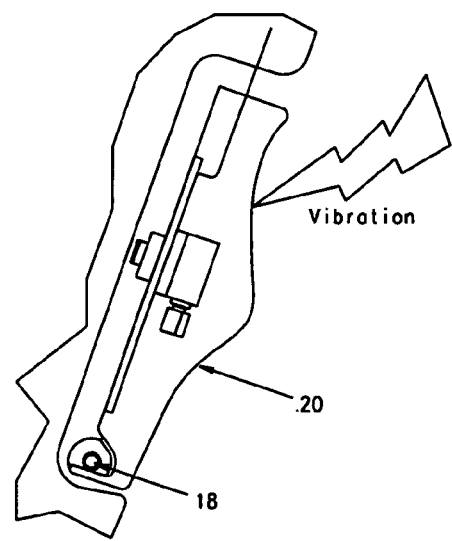
FIG. 4 is an enlarged cross-sectional view of the trigger of the current invention, as installed in a device.

FIG. 1 shows a pair of gun-shaped mobile computing devices 101 and 101A merely to be illustrative of the kinds of hand-held electronic devices which may incorporate the trigger assembly 20 of the current invention. The trigger assembly 20 is shown incorporated into such a device and with a user's hand grasping the device in the side view of FIG. 2. The trigger assembly 20 may extend along the handle 102 of the device 101 so that an index finger 12 and middle finger 13 may contact the button and be able to directly receive tactile alerts in the form of vibrations from the trigger assembly 20. The trigger may be extended so that all four finger of the user contact the trigger to directly be exposed to vibrations. The gripping regions for the index finger 12 and middle finger 13 are more visible in the enlarged views of FIGS. 3 and 4.

Figure 5:
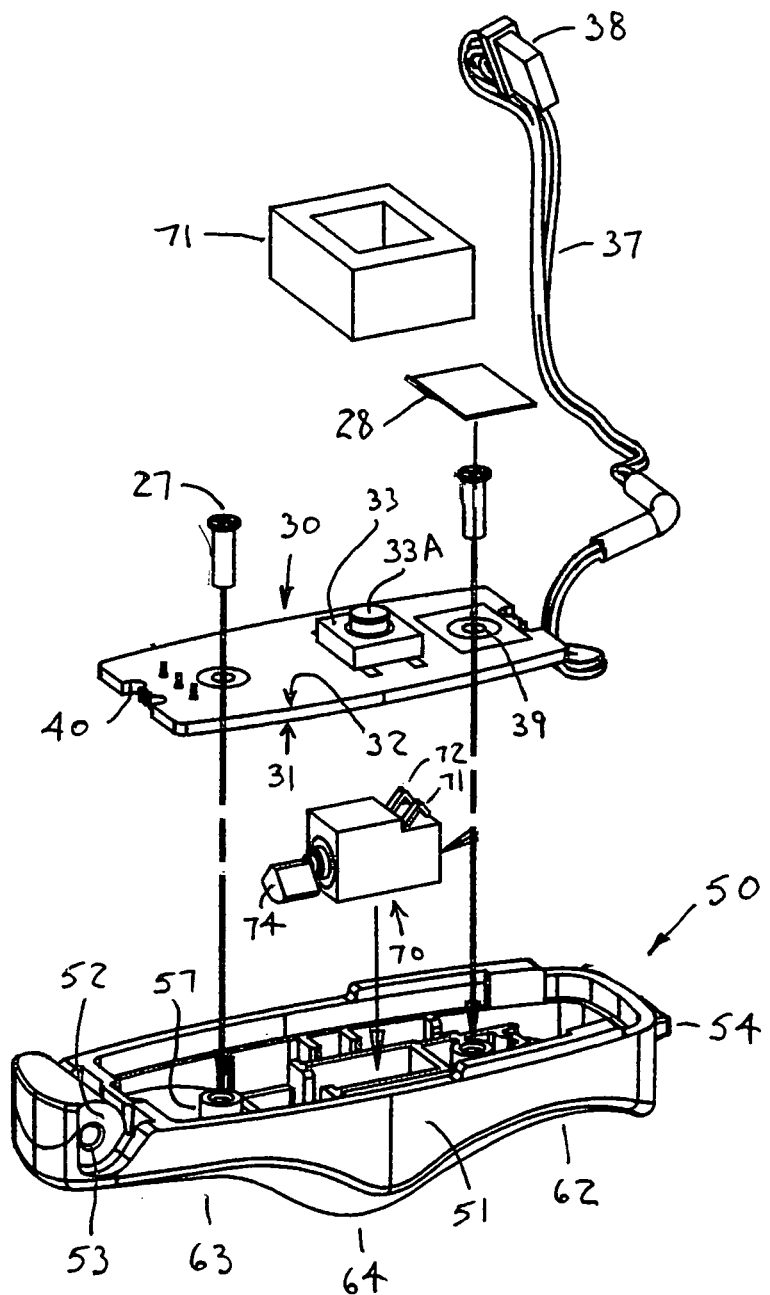
FIG. 5 is an exploded view of the components of the trigger of the current invention.
Figure 6:
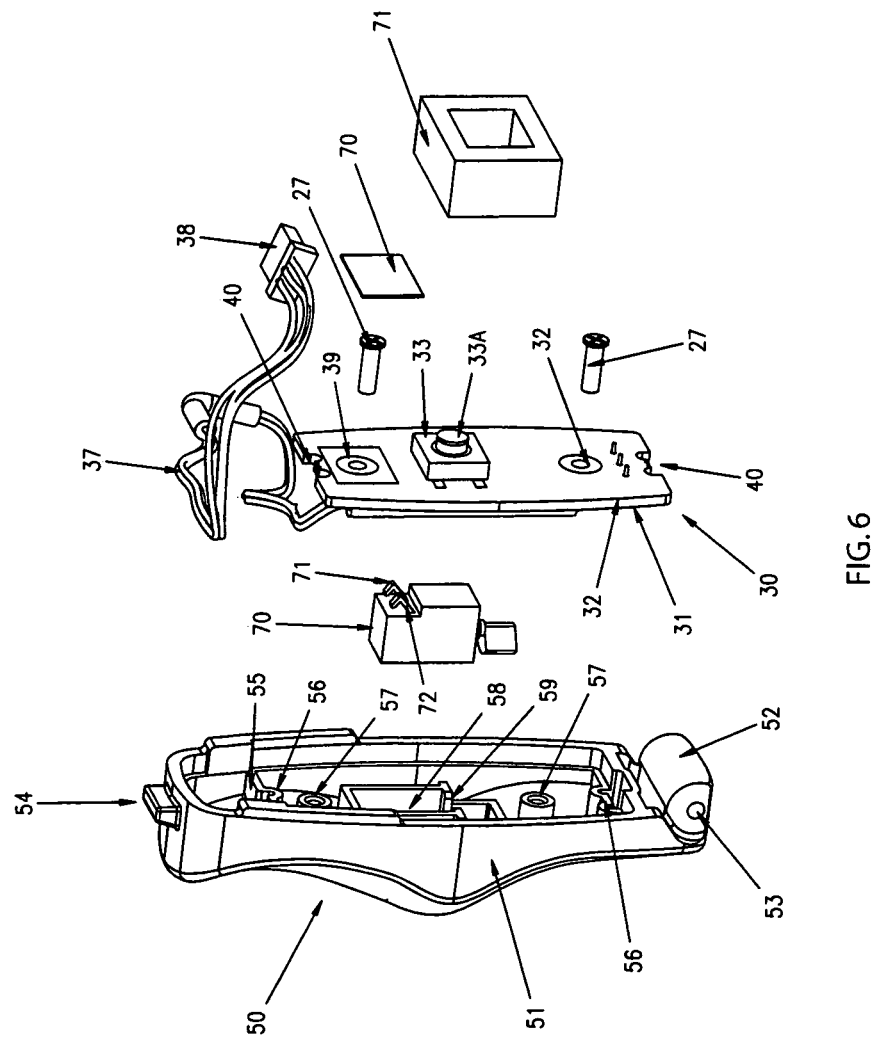
FIG. 6 is a reverse exploded view of the components of the trigger of the current invention.

As seen in the perspective views in FIGS. 5 and 6, the trigger assembly 20 may be comprised of a housing 50. The housing 50 may be formed of any suitable material, including, but not limited to, molded plastic. A metal cast part for the housing 50 may be beneficial in the transmission of vibrations, and although it may add unnecessarily to the overall weight of the unit, it may remain an option for certain users.

Housing 50 may be formed into many different shapes, but to provide an ergonomic fit with the user's hand, as well as to provide a larger surface area of contact with the user, a preferred embodiment of the housing may have a portion of the outside surface contoured with a gripping region 62 for the index finger 12 and a separate gripping region 63 for middle finger 13. The gripping regions 62 and 63 may be separated by a contoured ridge 64, which may serve to enhance the ergonomic fit of the housing 50 of trigger assembly 20 with the user's hand, as well as to increase the surface area of contact between the trigger and the user's hand, as the ridge may contact the sides of the user's fingers. There may be multiple ridges for an embodiment with seeks to expose more than just two fingers to the vibrating trigger. The gripping region may transition into an outer shell wall 51, which may generally form a rectangular shape.

The housing 50 may preferably be formed to have a boss 52 at one end, through which may be an orifice 53. The orifice 53 may be used to pivotally mount the trigger assembly into device 101, as discussed hereinafter. Also, the housing may have a protrusion located on the periphery to serve as a stop in limiting pivotal travel of the trigger assembly 20, once installed in a device. In one embodiment, the protrusion 54 may preferably be located on the end opposite of the end upon which is located the orifice 53 and boss 52.

The housing 50 may also have a cavity to create an interior surface, which may be sculpted to provide supporting features molded or formed in the cavity. One feature may be a plurality of walls 58 to support installation of a vibrator motor 59.

The vibration motor 59 may preferably be a miniaturized vibrating motor being very compact and light-weight, but producing vibrations of sufficient intensity so as to provide tactile notification to the hand of the average person. In one embodiment, the motor may be the coreless cylindrical permanent magnetic micro vibration motor manufactured by Jinlong Machinery & Electronics Co., Ltd., having the part number Z4TH3B0300022 (Old Part No. 4TH3-3002B30). The Jinlong Z4TH3B0300022 micro vibration motor has an approximate weight of 1.0±0.02 grams (0.0022 pounds), and operates at 10,500 revolutions per minute (rpm) at the rated voltage of 3 volts DC. It also has a rated current of 95 mA max at the rated voltage and rated load (counterweight), and has an operating voltage of 2.2-3.6 V DC.

Figure 7:
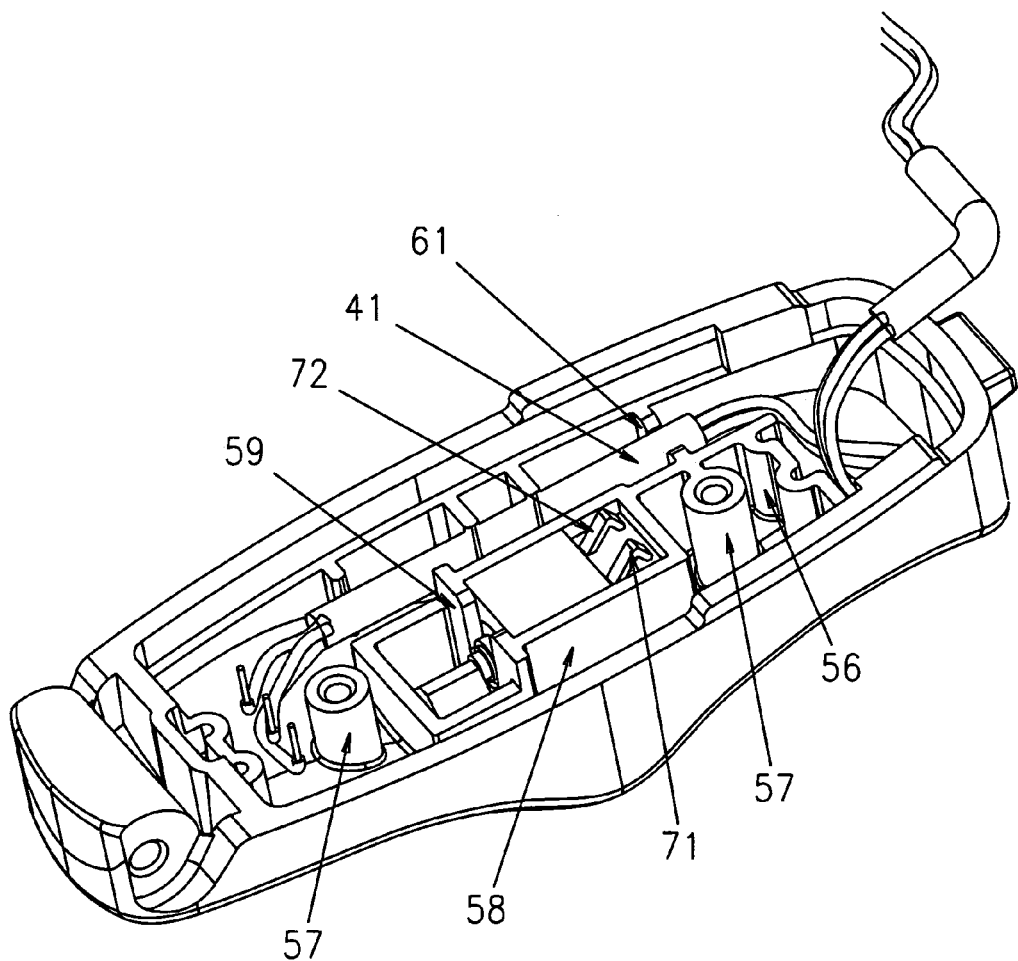
FIG. 7 is an enlarged perspective view of the vibrating motor installed in the trigger of the current invention.
Figure 8:
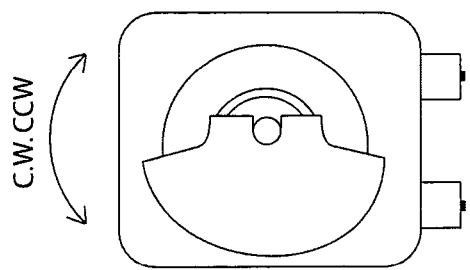
FIG. 8 is a series of orthogonal views defining the envelope and features of the vibrating motor.
Figure 8:
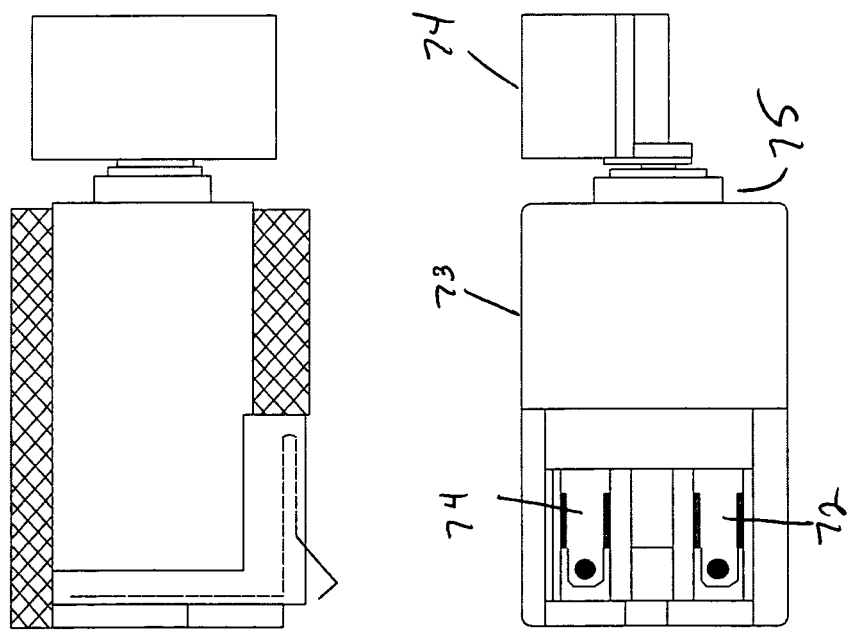
Figure 8:
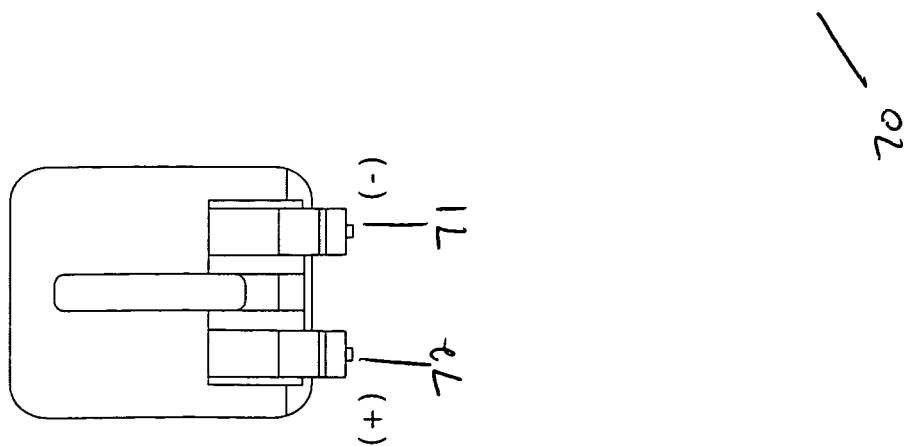
Figure 9:
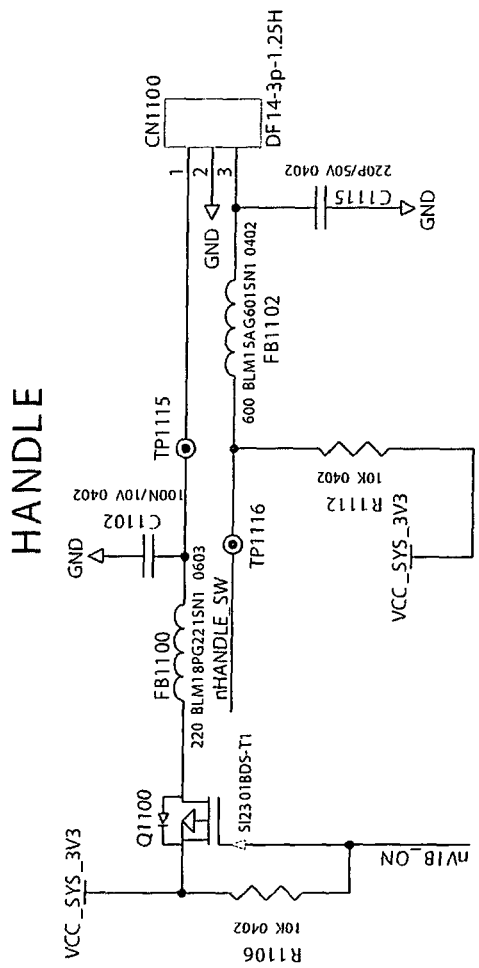
FIG. 9 is an electrical schematic of the design implementation of the trigger switch functionalities with respect to the handle.
Figure 9A:
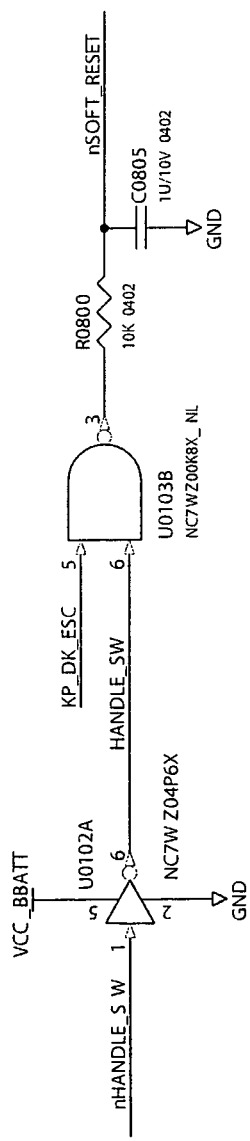
FIG. 9A is an electrical schematic of the design implementation of the trigger switch functionalities with respect to the processor input signal for the activation of a System Cold. Reset.
Figure 9B:
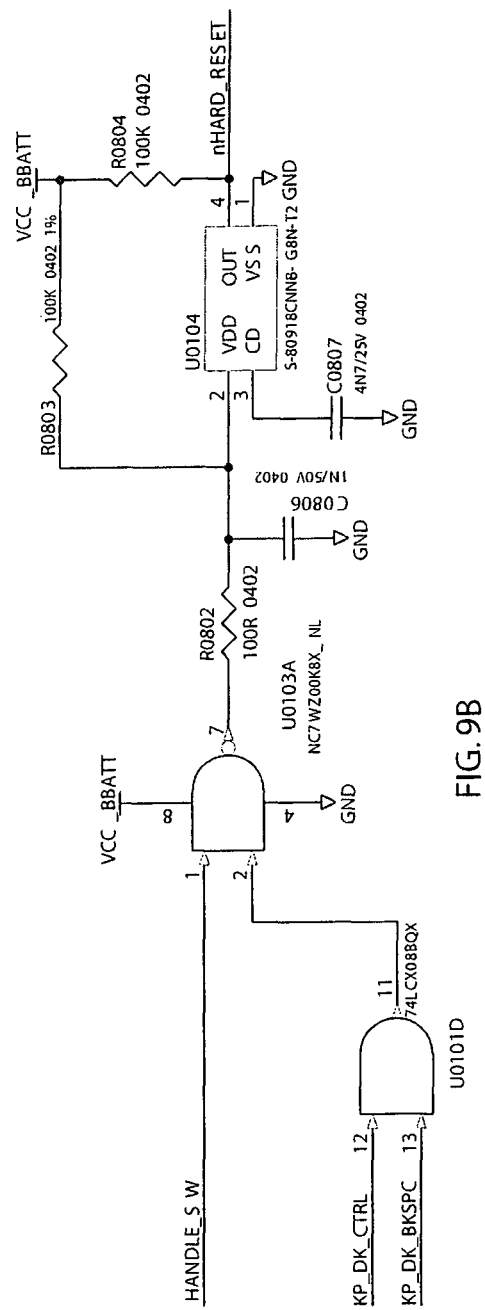
FIG. 9B is an electrical schematic of the design implementation of the trigger switch functionalities with respect to processor input signals for the activation of a System Warm Reset.
Figure 10:
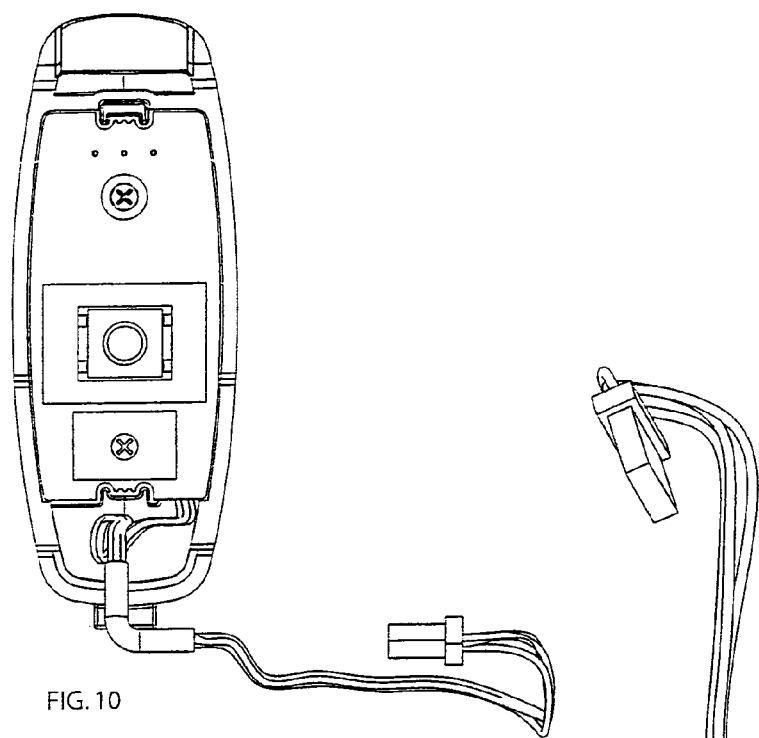
FIG. 10 is a front view of the trigger assembly of the current invention, shown without the foam block pad.

An envelope drawing for the Z4TH3B0300022 motor is shown in FIG. 8. The motor has a body 73 with a depth of approximately 5.3 mm (1.35 inches) and a width of 6.2 mm (1.57 inches). The width of the motor is increased by 1 mm (0.03 inches) by a pair of electrical prongs 71 and 72 protruding outward from one end, which serve as the negative and positive electrical contacts respectively. The length of the body is approximately 8.2 mm (2.08 inches), from which extends the rotatable eccentric counterweight 74, which adds 4 mm to the length: 1 mm for the exposed shaft 75, plus 3 mm for the counterweight weight. Therefore, the plurality of walls 58 to support installation of the Jinlong Z4TH3B0300022 micro vibration motor may preferably be tailored for a close fit with the dimensions of the body 73, while leaving an opening 59 for the shaft 75 and counterweight 74 to protrude therefrom (FIG. 7).

The interior surface of housing 50 may further comprise one or more posts 57 having an orifice 58 therein which may be used to support a printed circuit board 30, which may have a first side 31 and a second side 32. The first side 31 may be comprised of appropriate conductive pathways, while the second side 32 may be comprised of the non-conductive substrate. With the micro vibration motor 59 installed within the plurality of walls 58, the prongs 71 and 72 will be protruding beyond, so that they may be electrically coupled to the first side 31 of the printed circuit board 30. The interior surface 50 may also have one or more posts 57, each of which may have an orifice 58 located therein.

Figure 11:
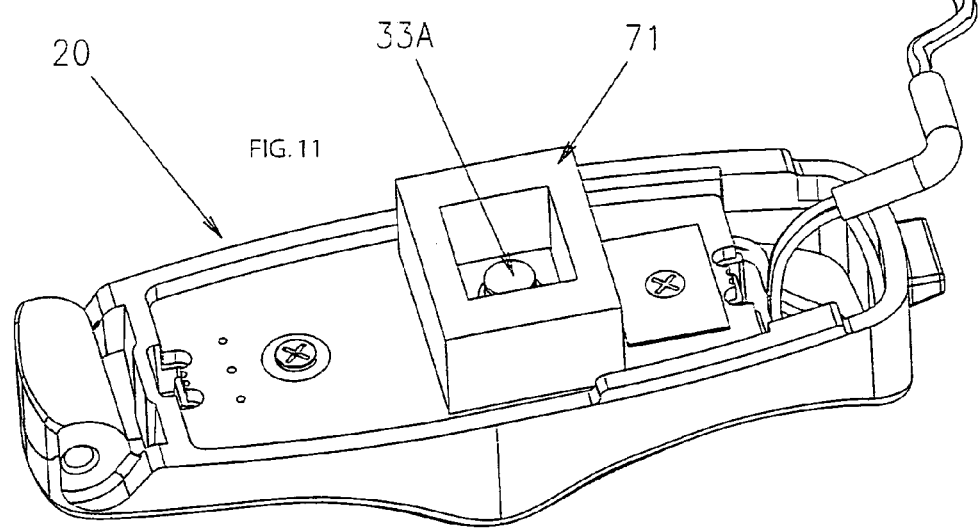
FIG. 11 is a perspective view of the trigger assembly of the current invention, with the foam block pad installed.

The printed circuit board 30 may have one or more mounting holes 39, which may be used along with screws 27 to mount the circuit board to the posts 57. Since the posts 57 may preferably have orifice 58 without internal threading, the screws 27 may be plastic, self-tapping screws. In a preferred embodiment, the screws may be a Philips flat head carbon steel screw, to be flush with the second side 32 of the printed circuit board 30 as shown in FIG. 11. In addition, the printed circuit board 30 may be supported by curved supporting walls 56, where the printed circuit board may also have corresponding curved edges 39 to nest within the curved supporting walls 56 like a key and keyway. The printed circuit board 30 may also be installed with the use of glue.

The electrically conductive pathways of printed circuit board 30 may have one or more wires 37 coupled thereto, where the wires 37 terminate in a connector 38. The wire bundle 37 may be grouped together where they emanate from the circuit board 30 using a shrink wrap cover 41 or other type of sleeve or casing, which may be received in a loose press fit between one or more pairs of walls 61, to prevent tearing out of the wire connection at the printed circuit board 30.

The second side 32 of the printed circuit board 30 may have a platform 33 mounted upon it, from which may be a cylindrical post 33A protruding outward. The platform 33 may be located on the circuit board so as to be directly opposite to where vibration motor 59 may contact the first side 31 of the circuit board 30, to prevent eccentric loading of the circuit board which may cause bending and possibly result in either electrical shorts or breakage of the board itself. With one end of a coil spring 25 being retained by cylindrical post 33A and the other end being retained within the device 101, the trigger assembly 20 may tend to oscillate about the orifice 52 in boss 53 of the trigger housing 50 when appropriately installed in the device and caused to vibrate. Without vibrations, the spring may bias the trigger assembly 20 to an extended position. A torsion spring may be used in conjunction with the pivotal mounting of the trigger, instead of the coil spring.

A block-shaped foam pad 71 may overlay the platform 33 and serve to damp oscillations of the pivotal trigger assembly 20, particularly when driven at or near the natural resonance frequency of the spring-mass system formed therein. The block-shaped foam pad 71 may also serve to limit inward travel of the pivoting trigger assembly 20 into its second position—the engaged position, which would otherwise be reached when the user squeezes the trigger to make an input to the device. The first position would conversely be the outwardly biased rest position of the trigger. Alternatively, inward travel of the trigger assembly 20 may be limited by a second lip in the cavity 104 of handle 102 to serve as a stop for protrusion 54.

Figure 12:
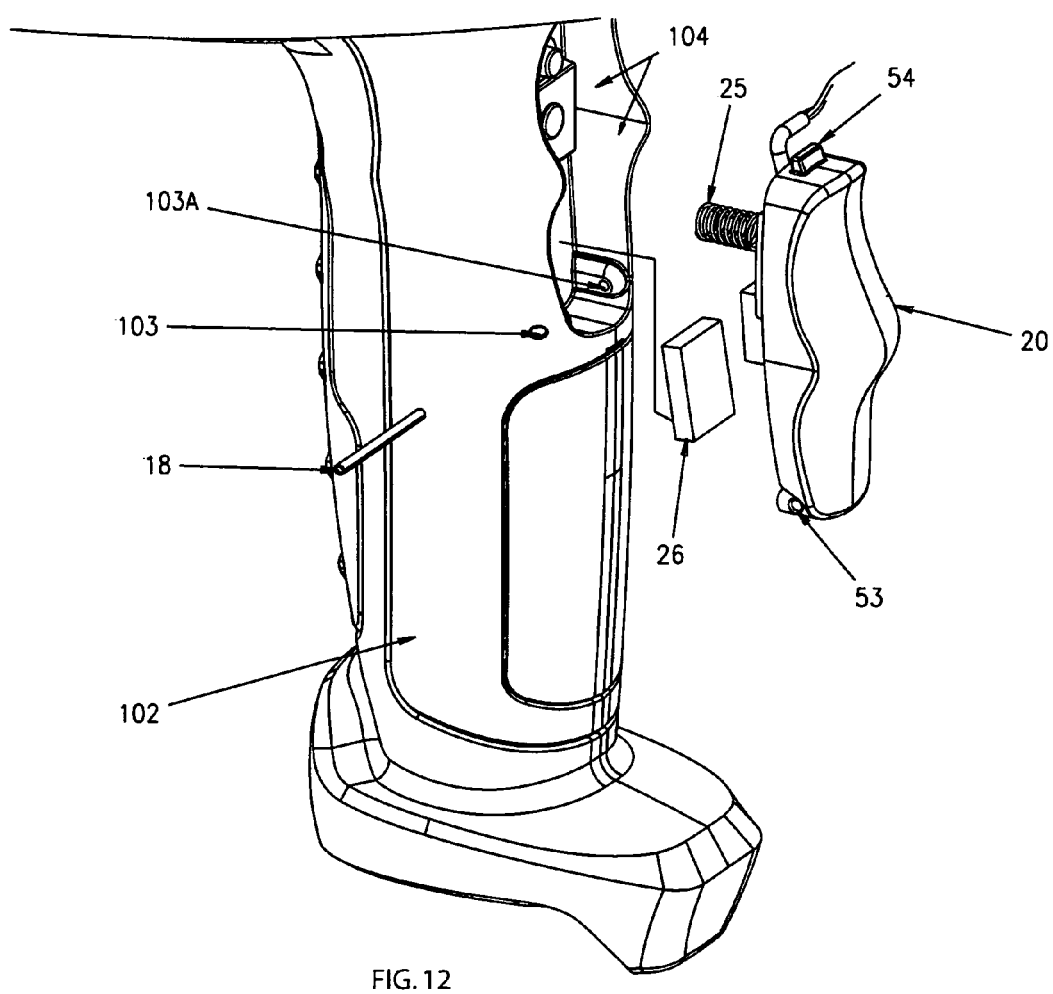
FIG. 12 is a perspective view of the handle of the device of FIG. 1, with the trigger assembly of the current invention being installed.

The installation of the trigger assembly 20 may proceed by first mating the connector 38 of the printed circuit board 30 with a receiving connector in the device (not shown), which may be coupled to the main board in the device. The trigger assembly 20 may then be inserted into the cavity 104 such that the end with protrusion 54 enters the cavity first and is received behind a lip (not shown) in the handle 102. As shown in FIG. 12, the trigger assembly 20 may then be pivotally mounted in handle 102 of device 101, in one embodiment, by press fit inserting pin 18 in a first orifice 103 of the device, passing it through the orifice 53 of the trigger housing 50, and then continuing insertion of the pin 18 so as to be received in a second orifice 103A of the device. A rectangular foam pad 26 may also be applied to the second side 32 of printed circuit board 30 using double sided tape 28 or glue to also contribute to damping.

With the trigger assembly 20 so connected to the device—both mechanically and electrically—it may be utilized as may any ordinary trigger in a scanning device or portable computing device 101. However, when the system recognizes a successful operation and is programmed to provide a tactile alert to the user, the printed circuit board 30 may receive a signal through the connector to activate the vibrating motor 70 by supplying it with direct current, causing the motor 70 to spin the counterweight 74, and generate vibrations.

The spring mass arrangement may be constructed so that the vibrating motor 70 produces vibrations to drive the spring biased trigger assembly 20 near its natural resonance frequency—being at it, above it, or below it—to produce the maximum response in the trigger so as to be most noticeable to the fingers of the user holding the device. The natural frequency, $\omega_0$, is defined by the equation, $\omega_0 = (k/m)^{1/2}$ where k is the spring constant in Newtons/meter, and m is the mass in kilograms.

Where the foam cushions may be used to damp the oscillatory motion of the trigger assembly 20, after the tactile alert is ceased by termination of the direct current to the motor, the spring mass arrangement may be calibrated so that the is "overdamped," "critically damped," or preferably "underdamped." For a damped system, the natural damped frequency, $\omega_d$, is defined by the mathematic equation, $\omega_d = \omega_0 (1-\lambda^2)^{1/2}$ which is a function of the (undamped) natural frequency $\omega_0$ of the system, and $\lambda$ the damping ratio, which is the dimensionless quantity given by $\lambda = c/(2\sqrt{mk})$, where c is the viscous damping coefficient, given in units of Newton-seconds per meter. The spring biased trigger assembly 20 may return to equilibrium if "overdamped," with $\lambda > 1$; if critically damped with $\lambda = 1$; and if "underdamped" with $0 < \lambda < 1$.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

The invention claimed is:

1. A vibrating trigger, said trigger comprising
a user contact surface having one or more side walls extending away from said user contact surface defining a housing, a portion of said housing being adapted to accommodate biased pivotal mounting of said trigger and another portion having a feature capable of limiting pivotal travel of said trigger; said housing having a vibrator motor and a printed circuit board within said housing; said motor being electrically coupled to said printed circuit board; said printed circuit board comprising one or more wires extending therefrom and terminating in a connector; and wherein said printed circuit may receive a signal through said connector to activate and power said vibrating motor, said vibrating motor causing vibrations to be received by said user contact surface of said housing.

2. The vibrating trigger according to claim 1, wherein said vibrator motor comprises a miniaturized vibrating motor.

3. The vibrating trigger according to claim 2, wherein said miniaturized vibrator motor comprises a coreless cylindrical permanent magnetic micro vibration motor.

4. The vibrating trigger according to claim 3, wherein said miniaturized vibrator motor weighs approximately 1 gram.

5. The vibrating trigger according to claim 4, wherein said pivotal mounting of said trigger is accommodated by an orifice in said housing.

6. The vibrating trigger according to claim 5, wherein said pivotal mounting of said trigger further comprises a boss in said housing, said orifice in said housing being through said boss.

7. The vibrating trigger according to claim 6, wherein said feature capable of limiting pivotal travel of said trigger comprises one or more protrusions on said housing to serve as a stop.

8. The vibrating trigger according to claim 7, wherein said vibrations may be transmitted directly across a wall of said trigger to one or more fingers of a user's hand.

9. The vibrating trigger according to claim 8, wherein said outside surface of said trigger housing comprises ergonomic contouring to accommodate gripping by a first finger and a second finger.

10. The vibrating trigger according to claim 9, wherein said ergonomic contouring including a ridge between said first and second finger gripping.

11. The vibrating trigger according to claim 10, wherein said miniaturized vibrator motor comprises a body, said body having a counterweight rotatably extending from said body; and wherein the interior of said housing comprises a cavity shaped to retain said body.

12. The vibrating trigger according to claim 11, wherein said miniaturized vibrator motor further comprises two prongs protruding outward from said body, said prongs being electrically coupled to positive and negative terminals respectively on said printed circuit board.

13. The vibrating trigger according to claim 12, wherein said trigger is adapted to damp said vibrations, said damping being accomplished by a foam block.

14. The vibrating trigger according to claim 13, wherein the interior surface of said housing further comprises one or more posts, and wherein said printed circuit board is mounted to said one or more posts using one or more screws.

15. The vibrating trigger according to claim 14, wherein said screws are plastic, self-tapping screws.

16. The vibrating trigger according to claim 15, wherein said vibrating trigger is pivotally installed in a hand-held device, and wherein pivotal mounting is by a pin inserted in a first side of said device and through said orifice of said trigger, and out a second side of said device.

17. The vibrating trigger according to claim 16, wherein said pin is press-fit inserted into said first and second sides of said device.

18. The vibrating trigger according to claim 16, wherein said pin comprises a nut and bolt.

19. The vibrating trigger according to claim 18, wherein said installation of said trigger in said device further comprises said connector of said printed circuit board being connected to a main circuit board in said device.

20. The vibrating trigger according to claim 19, wherein said one or more protrusion on said housing limit pivotal travel of said trigger by contacting a lip in said device.

21. The vibrating trigger according to claim 20, wherein said spring-loaded pivotal trigger has a natural resonance frequency, and wherein said miniaturized vibrator motor causes vibrations at a frequency from one: below, at, or above said resonance frequency.

22. The vibrating trigger according to claim 21, wherein said miniaturized vibrator motor operates at approximately 10,500 rpm.

23. The vibrating trigger according to claim 22, wherein said body of said motor contacts a first side of said printed circuit board, and wherein a spring post extends from a platform mounted on a second side of said printed circuit board, said platform and spring post being mounted to be directly opposite to said motor body.

24. The vibrating trigger according to claim 23, wherein a first end of a spring is retained by said spring post, and a second end of said spring is retained in said device to bias said trigger to an outward position.

25. The vibrating trigger according to claim 24, wherein said spring is a coil spring.

26. The vibrating trigger according to claim 24, wherein said spring is a torsion spring.

27. In a hand-held device having a circuit to prompt a user of said device, the improvement comprising a trigger switch capable of also providing tactile alerts to one or more fingers of a user's hand when signaled by said device, said trigger switch comprising a a user contact surface having one or more sidewalls extending away from said user contact surface to define a housing, said housing having an orifice, said trigger switch being pivotally mounted to said device using said orifice; a spring, said spring biasing said trigger switch from a first position to a second position; said trigger switch further comprising one or more protrusions, said one or more protrusions serving as a stop by contacting said device to limit outward pivotal travel of said trigger switch from said first position to said second position; said housing having a vibrating motor and printed circuit board within said housing, said vibrating motor being electrically coupled to said printed circuit board; said printed circuit board being electrically coupled to said device; and wherein when said device signals said printed circuit board, said vibrator motor causing said trigger switch to vibrate.

28. The improvement of claim 27, wherein said pivotal mounting is by a pin inserted through a first orifice in said device, and through said orifice in said trigger housing, and into a second orifice in said device.

29. The improvement of claim 28, wherein said spring is a coil spring.

30. The improvement of claim 29, wherein said spring is a torsion spring.

31. The improvement of claim 30, wherein said trigger button of said trigger switch may contact one or more fingers of a user.

32. The improvement of claim 31, wherein said trigger switch comprises ergonomic contouring to accommodate gripping by first and second fingers, said ergonomic contouring including a ridge between said first and second finger grips.

\* \* \* \* \*